Jan. 10, 1950 E. V. GARNETT Re. 23,187

AUTOMOBILE TRANSPORTING TRUCK

Original Filed July 27, 1946 3 Sheets-Sheet 1

Inventor
Edward V. Garnett
By Dwight Mitton Jones
Attorneys

AUTOMOBILE TRANSPORTING TRUCK

Original Filed July 27, 1946 3 Sheets-Sheet 2

Inventor
Edward V. Garnett
By Dwe Nutter Jones
Attorneys

Jan. 10, 1950 E. V. GARNETT Re. 23,187

AUTOMOBILE TRANSPORTING TRUCK

Original Filed July 27, 1946 3 Sheets-Sheet 3

Inventor
Edward V. Garnett
By Dwa Milton Jones
Attorney

Reissued Jan. 10, 1950

Re. 23,187

UNITED STATES PATENT OFFICE 23,187

AUTOMOBILE TRANSPORTING TRUCK

Edward V. Garnett, Denver, Colo.

Original No. 2,454,554, dated November 23, 1948, Serial No. 686,749, July 27, 1946. Application for reissue July 1, 1949, Serial No. 102,649

5 Claims. (Cl. 296—1)

Matter enclosed in heavy brackets [ ] appears in the original patent but forms no part of this reissue specification; matter printed in italics indicates the additions made by reissue

This invention relates to improvements in trucks and has reference more particularly to a truck of the type employed in transporting automobiles.

It is quite customary to transport automobiles by trucks, instead of by train, and for this purpose various types of trucks have been invented.

It is evident that in order to keep the cost of transportation down and enable the truck owner to obtain a reasonable profit at a cost which is less than the cost of transporting automobiles by train, more than one automobile must be transported at a time.

[The various States have rules and regulations limiting the height, width and length of transports, and in accordance with these regulations it has been practically impossible to transport more than four automobiles at one time, two being carried by the tractor and two by the trailer or none by the tractor and four by the trailer.]

*The various States have rules and regulations limiting the height, width, and length of transports, the commonly accepted limitations being 45 feet in length, 2½ feet in height and 8 feet in width. Previously, in accordance with these regulations, it has been practically impossible to transport more than four automobiles at one time. In one of the earliest transport units shown and described in the Lishon Patent 1,809,557, four automobiles were supported entirely on the truck or tractor and no trailer was used in combination with the tractor. Transport devices such as Lishon's, however, cannot be used because of present-day restriction limiting the overall length of any single unit to not more than 35 feet. With present-day automobiles averaging between 16 and 18 feet in length, the overall length limitation would be greatly exceeded using Lishon's transport device because of the fact that three of the four cars carried by Lishon's truck must be arranged substantially in end to end relationship, thus not only exceeding the length limitation for single units but for tractor-trailer combinations as well.*

*Other types of four car units are the trailers shown in Patents Nos. 1,925,535, 2,119,671, and 2,385,115 wherein each is provided with tracks arranged to support two automobiles end to end at a low level and two more automobiles end to end at a higher level. These trailers are adapted to be drawn by a truck or tractor of the short wheel-base type.*

*Four car tractor-trailer combinations are also*

*shown in Patents Nos. 2,004,438, 2,096,455, 2,135,301, and 2,146,567; there being two cars carried by the tractor one over the other, and two by the trailer likewise one substantially over the other.*

*Still another type of automobile transport device is shown in the patents to Judd 2,004,439 and Francis 2,103,669. These patents, however, concern three car transport units wherein all three of the cars are carried on tracks in an elongated trailer adapted to be drawn by a truck or tractor carrying no automobiles.*

It is evident that the cost of transporting five automobiles at a time would not be appreciably more than the cost of transporting four automobiles, and therefore, if a truck can be designed so as to make it practical in connection with a trailer to transport five automobiles and still remain within the limits prescribed by the traffic regulations, the truck owner can collect the additional freight for one automobile with substantially the same expense, thereby increasing his profit without adding to the cost of freight per automobile.

[It is the object of this invention to produce a truck of such a construction that three automobiles can be transported on the tractor and leave the latter of such length that when a trailer capable of transporting two automobiles is attached, the length of the tractor and trailer will not exceed the prescribed limits.]

*It is the object of this invention to produce an automobile transport truck or tractor of such construction that three automobiles can be transported thereon and leave the tractor of such length that when a trailer capable of transporting two automobiles, one over the other, is attached to the tractor, the combined length of the tractor and trailer will not exceed the prescribed limits.*

*More specifically it is an object of this invention to provide an automobile transporting truck or tractor with three sets of automobile supporting elements thereon and to arrange said elements on the truck in a particularly compact manner so that the overall length of the truck either loaded or unloaded will not exceed a dimension equal to the commonly accepted length limitation of 45 feet minus the length of one of the cars, which car may be assumed to correspond to the length of the trailer which is to be drawn by the truck.*

Automobile transporting trucks have been designed so that four automobiles may be carried by the tractor or truck, but such trucks are of such length that no trailer can be attached, and therefore the number of automobiles carried per unit assembly does not exceed four, whereas with the present construction, although the tractor unit carries three automobiles, it is so designed that its length permits a trailer carrying two automobiles in addition, to be attached.

Having thus briefly described the objects of the invention, the invention itself will now be described in detail and for this purpose reference will be had to the accompanying drawings in which the invention has been illustrated, and in which.

Figure 1:
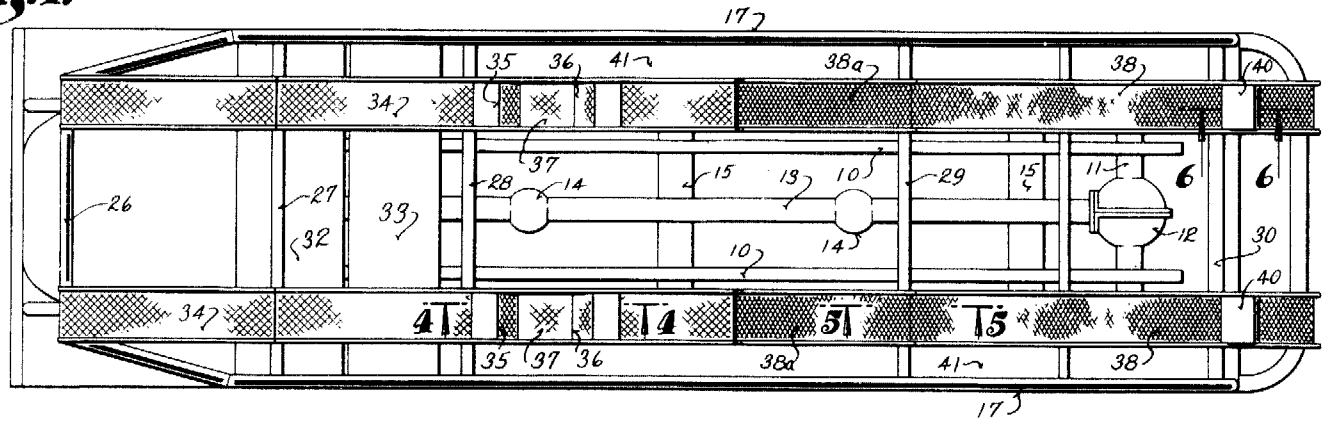
Figure 1 is a top plan view of the tractor or the truck carrying the power unit, various features that are common and well known have been omitted in the drawing so as to simplify it and permit the essential features to be more clearly shown.

The truck that forms the subject of this invention is provided with a chassis frame, the two parallel side members of which have been shown in Figure 1 and designated by reference numeral 10. The rear axle has been designated by reference numeral 11, the differential by reference numeral 12, and the torque tube by reference numeral 13. [The engine is positioned underneath the cab in the usual way and has not been shown.] *It is essential that the truck be of the type having its cab 9 at the extreme front of the truck, in the present case over the front wheels of the truck; and in this type of truck the engine is positioned underneath the cab in the usual way but has not been shown.* The torque tube and shaft are provided with several universals that have been designated by reference numeral 14. As many universals as may be found desirable may be employed.

Figure 2:
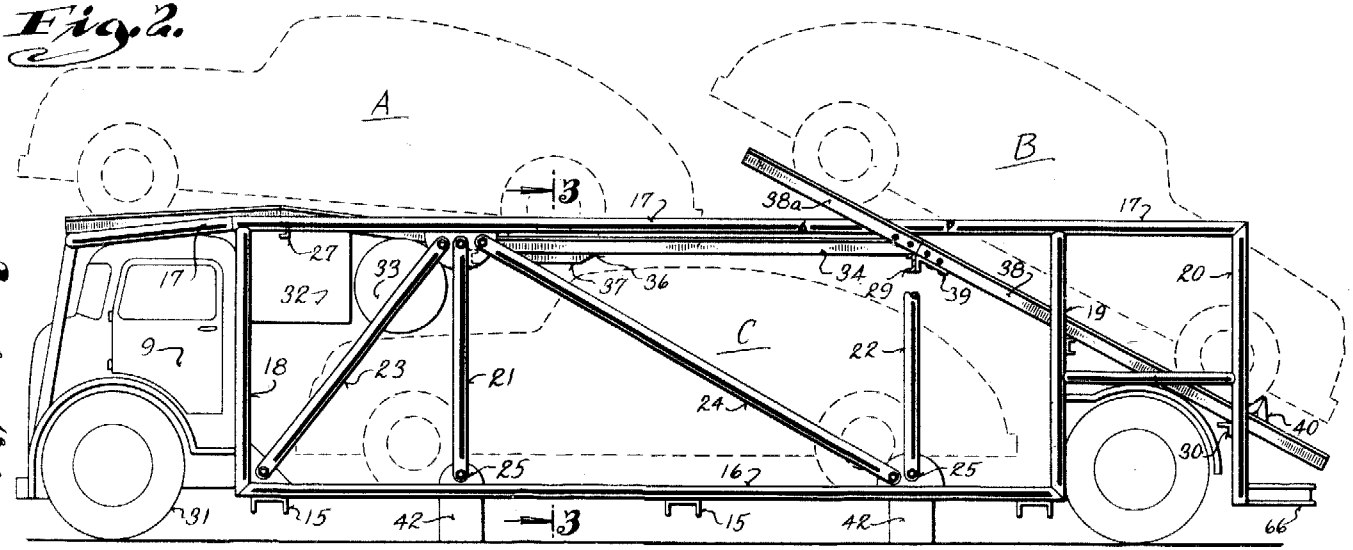
Figure 2 is a side elevation of the truck shown in Figure 1.
Figure 3:
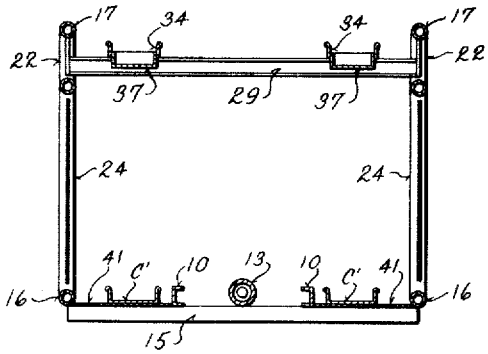
Figure 3 is a vertical cross section taken on line 3—3, Figure 2.

Extending across the chassis frame are several channels that have been designated by reference numeral 15 and these support a frame having two substantially identical sides constructed in the manner shown in Figure 2, each having a tubular bottom member 16, a corresponding top member 17, vertical members 18, 19 and 20 and a bridge work comprising compression members 21 and 22 and tension members 23 and 24. Members 21 to 24, inclusive, are secured to one of the side frames by means of bolts 25, so as to be readily removable. The purpose of this removability will appear hereinafter. [Top frame members 17 are interconnected by transverse members 26, 27, 28 and 29.]

*The bottom frame members 16 extend longitudinally of the truck substantially between the front and rear wheels thereof, while the top frame members 17 extend for substantially the entire length of the truck, that is, from the extreme front to the rear thereof. From this general description it will be seen that the truck of this invention has a body, the main portion of which lies between the front and rear wheels, a cab over engine portion at the forepart of the body or at the extreme front of the truck, and that the rear portion of the body extends over the back wheels of the truck. The bottom of the body, of course, is substantially on the level of the bottom frame members 16, and thus adjacent to the level of the wheel axes.*

*The top frame members 17 are interconnected by transverse members 26, 27, 28, and 29, the member 26 extending across the frame adjacent to the extreme front of the truck, the member 29 extending across the frame about two-thirds of the way back from the front of the truck and the members 27 and 28 being disposed intermediate the members 26 and 29.* As many more transverse members as may be found necessary or desirable may be used. Those shown are believed to be sufficient for the ordinary truck of this type.

A *rear* transverse member 30 [is positioned] *joins the rearmost vertical members 20* at some distance below the top [rail] *rails and preferably near the lower ends of the members 20,* as shown in Figure 2, and *this transverse member 30* may either be a round pipe or an angle iron.

The cab, as above stated, is positioned above the front wheels 31 [directly] *and at the extreme front of the truck. Directly* back of the cab and underneath the top frame members is a compartment that has been designated by reference numeral 32 [and contains] *which may contain* a bed for use of one of the drivers while the other is operating. Directly back of the sleeping compartment is an auxiliary gas tank 33.

[Supported on the top of the frame are two tracks 34. The front ends of tracks 34 rest on the transverse member 26. These pass]

Figure 9:
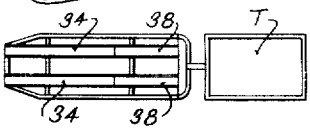
Figure 9 is a diagram showing the truck and trailer in assembled relation.

*The truck of this invention is adapted to carry three full size automobiles, and to pull a trailer carrying two more automobiles, one above the other. In order to accomplish this objective without exceeding the commonly accepted limitations of 45 feet for the length and 12½ feet for the height of the tractor-trailer combination, the three cars carried by the truck are supported thereon in such an arrangement that the loaded length of the truck does not exceed a dimension roughly equal to the accepted length limitation of 45 feet minus the length of the trailer. Assuming, by way of illustration, that full size automobiles average about 17 feet in length and that the length of the trailer T shown in Figure 9 is no greater than that of the automobiles thereon, the length of the truck is made substantially less than twice the length of the automobiles to be carried thereon, or more specifically, not greater than the 45 foot length limitation minus about 17 feet for the loaded length of the trailer, or about 28 feet in length or less. The combined lengths of two automobiles (about 34 feet) exceeds this dimension by about six feet, and it will thus be apparent that no two of the three automobiles are arranged lengthwise end to end on the truck.*

*The present invention solves the problem of transporting five automobiles, using a two car trailer as described, by the following novel ar-*

*rangement of three sets of automobile supporting elements or tracks on the truck; it being understood that each set of elements is adapted to receive both the front and rear wheels of the automobile supported thereby.*

*One set of automobile supporting elements is mounted in a generally horizontal position on the forepart of the body of the truck at about the level of the top frame members 17, and this set comprises the two elongated tracks 34. The front ends of tracks 34 extend forwardly over the top of the cab 9 and the front wheels thereunder to rest on the foremost transverse member 26 adjacent to the extreme front of the truck, and the tracks pass rearwardly* over and rest on transverse members 27 to the rear of which the [track is] *tracks are* downwardly inclined to point 35. At this point the bottom *of each* is removed to point 36 and a pan 37 is positioned in the opening thus formed in a manner illustrated in Figure 4. The two tracks 34 then extend *further* rearwardly and rest on the transverse member 29.

[One automobile may be supported on the two tracks that have just been described and will occupy the position A indicated by dotted lines in Figure 2, the rear wheels resting in pans 37.]

[To the rear of tracks 34 are two tracks of a similar construction which have been designated by reference numeral 38. These terminate at the top of transverse channel 29 and are secured to the latter by angle brackets 39. Tracks 38 incline downwardly and rest on the transverse member 30 and extend rearwardly of the latter, as shown in the drawing. The size and shape of tracks 38 are the same as those of tracks 34. Attached to the upper end of each track 38 is an extension 38a which projects upwardly to a considerable distance above the corresponding track 34. The total]

*One automobile, indicated by dotted lines in Figure 2 and designated A, is adapted to be supported on the tracks 34 with the rear wheels of the automobile received in the pans 37 and the foremost end extending forwardly over the cab of the truck to the extreme front of the truck. While the tracks 34 may be considered as generally horizontally disposed, it will be clear from a consideration of Figure 2 that they nevertheless hold the automobile A thereon with its rear end tilted downwardly for a purpose to be described shortly. It is important to note, however, that the rear portions of the tracks 34 extend back over the main body portion of the truck and are spaced above the bottom of the body a distance such as to accommodate another automobile beneath them.*

*To the rear of tracks 34 is a second set of automobile supporting elements which comprise a pair of main tracks 38, and track extensions 38a detachably connected to one end of the tracks 38 in alignment therewith. This second set of supporting elements is mounted on the truck or tractor at the rear portion of the truck body in a position of relatively steep downward and rearward incline, with the track extensions 38a uppermost, and with the joint between the main tracks and the extensions closely adjacent to the level of the top frame members 17 and preferably directly alongside the transverse member 29 which is located just beneath the frame members 17. The upper ends of the main tracks 38 thus terminate adjacent to the top of the transverse channel 29, to which they are secured by angle brackets 39, while the track extensions 38a*

*project forwardly and upwardly considerably above the level of the rear of tracks 34.*

*The lower end portions of the tracks 38 extend rearwardly and downwardly over the back wheels to rest on the transverse member 30 and to project a slight distance beyond the endmost vertical members 20 to the rear of bumper 66, terminating at a level substantially corresponding to the level of the axes of the truck wheels.*

*The combined* length of tracks 38 and 38a is sufficient to accommodate the automobile which has been designated [by] B, this automobile being held in place by means of chocks 40. [It will be observed from an inspection of Figure 2, that the rear end of automobile A extends underneath the upward projections 38a so as to form an overlap at this point.]

*It will be observed from an inspection of Figure 2, that the two sets of supporting elements or tracks described are arranged on the truck in a manner such as to enable the rearmost end of automobile A to occupy a position just forwardly of but lower than the extensions 38a and beneath the foremost or upper end of the automobile B. The resulting overlap of the automobiles at this point is greatest when the rear ends of the automobiles A and B are adjacent to one another, as shown, and this overlap, together with the inclined position of automobile B achieves maximum foreshortening of the space the two automobiles occupy lengthwise of the truck; it being understood that the incline of tracks 38 and 38a is not so steep as to cause automobile B to exceed the 12½ foot height limitation.* This is an important feature of the construction because by arranging the tracks so that the two automobiles *A and B* can occupy the *overlapping* [position] *positions* shown in Figure 2, [in which position the front end of automobile B overlaps the rear end of automobile A,] it is possible to limit the length of the truck [body to such an extent that a trailer can be attached which has a capacity of two automobiles.] *to a dimension which is substantially less than twice the length of the cars A and B, or to accomplish foreshortening of the tractor to a degree such as to enable a trailer carrying two automobiles, one over the other, to be attached to the tractor without exceeding the overall length limitation (45 feet) of the truck-trailer combination.*

[A third automobile, which has been designated by reference character C, is positioned inside of the frame and rests on bottom plates 41. In order to introduce automobile C, it is necessary to remove the bridge members 21 to 24, inclusive,]

*A third automobile C is adapted to be carried by the truck in the bottom of its main body portion directly behind the cab 9 so as to lie as far forwardly as possible and preferably have its forward end closely adjacent to the front wheels of the truck. In this position the car C substantially fills the main body portion of the truck and extends partly beneath the automobile A, and partly beneath the automobile B; and has its rear end closely adjacent to the back wheels of the truck.*

*A third or bottom set of suporting elements is provided for this purpose. These elements comprise a pair of horizontal tracks C' resting on bottom plates 41 on a level with the bottom frame members 16 and spanning the space between the members 16 and the adjacent side members 10*

*of the chassis frame. It will be appreciated, of course, that the tracks C' extend rearwardly from a point adjacent to the back of the cab 9 to a point adjacent to the back wheels of the truck, and that they lie partly beneath both of the first two described sets of tracks, or substantially medially of the length of the truck.*

*Loading of the automobile C onto the truck may be accomplished by removal of the bridge members 21 to 24, inclusive,* and these have been attached by means of bolts in the manner above explained. When the bridge members are removed, the frame is weakened to some extent and during the loading and unloading, blocks 42 may be positioned underneath the frame member 16 on that side. During the time that these bridge members are removed, automobile C is introduced by the use of skids and dollies or in any other suitable way [and it may even be bodily lifted by man power and moved into position]. After automobile C has been inserted into the place provided therefor and blocked by means of suitable chocks, the bridge members are reapplied and blocks 42 removed. Of course it is obvious that jacks, such as ordinary automobile jacks, mechanical or hydraulic, can be substituted for blocks 42.

After the truck with its load has reached its destination, the automobiles positioned on the top, namely, A and B are first removed, after which the bridge members are removed and automobile C removed.

In order to make the loading simple, tracks 38 have been formed in two sections, as above intimated. Sections 38a have downwardly extending plates 43 that are bolted to the sides of tracks 38, as indicated at 44. When the extensions 38a have been removed, it is possible to load automobile A from the rear by attaching to the front end thereof a rope or cable forming part of a differential hoist or a block and tackle mechanism, *and drawing the automobile upwardly onto tracks 38 and then forwardly onto tracks 34.* After automobile A has been brought into position, the extensions 38a are reapplied and automobile B is brought into position by the hoisting mechanism and secured by chocks 40 and by any other additional means. In unloading automobile B is, of course, first unloaded, after which extensions 38a are removed and automobile A is unloaded by rolling it rearwardly.

[Of course it is possible to dispense with the removable extensions 38a, but in that case automobile A would have to be loaded and unloaded from the front of the truck which would be more difficult and require ramps of greater length and greater inclination.]

*If desired, the tracks 38 and 38a may be permanently joined together, or provided by single lengths of track having a length equal to the combined length of the tracks 38 and 38a. In this case, the automobile A is loaded and unloaded from the front of the truck using lengthy ramps.* The removable extensions 38a are therefore considered to be of great importance, although not absolutely essential.

Figure 4:
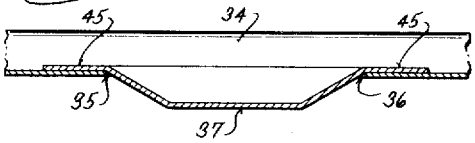
Figure 4 is a section taken on line 4—4, Figure 1, and shows the removable pan in position.

Referring now more particularly to Figure 4, it will be seen that tracks 34 have a portion of the bottom cut out as explained above and a pan 37 shaped to fit into the opening is provided. This pan has extending ends 45 that overlap the bottom of tracks 34. The pans form depressions for the reception of the rear wheels of automobile A.

Figure 5:
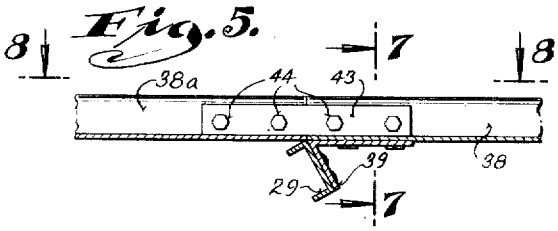
Figure 5 is a section taken on line 5—5, Figure 1, and shows the inclined track.
Figure 7:
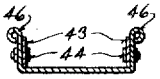
Figure 7 is a section taken on line 7—7, Figure 5.
Figure 8:
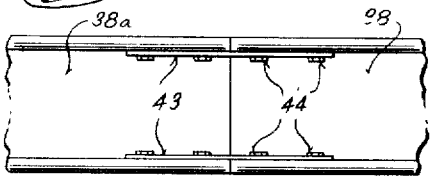
Figure 8 is a top plan view of a portion of the trough showing the two sections in assembled relation.

In Figures 5, 7 and 8, a construction is shown by means of which the removable extensions 38a may be attached to the tracks 38. In this proposed construction, plates 43 are connected with the sides of the two trough sections by means of bolts 44. The plates which are in the nature of "fish plates" may be permanently attached to one of the track sections. Although the construction shown for effecting a connection between the two sections is substantial and practical, it is to be understood that any other suitable means of effecting this interconnection may be employed.

The sides of the tracks are either rolled as indicated at 46, or an ordinary gas pipe may be welded to the vertical sides to give the tracks rigidity.

Figure 6:
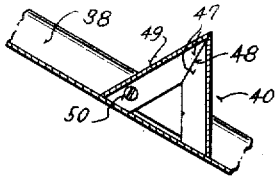
Figure 6 is a section taken on line 6—6 of Figure 1, and shows the wheel chock in position.

Chock 40, shown in Figure 6, is formed from angle irons 47 that are welded along 48 and are provided on at least one side with a plate 49. The chock is secured in position by means of a removable bolt or rod 50.

Figure 10:
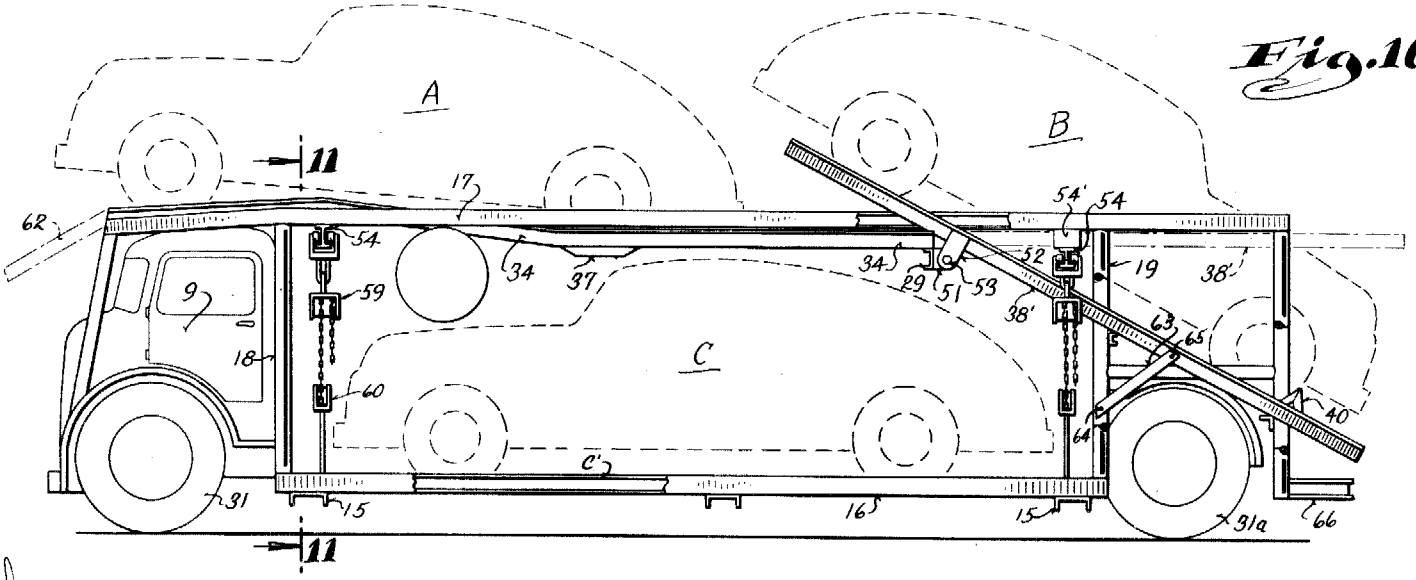
Figure 10 is a view showing a slightly modified form of construction.

In Figure 10, the bridge members 21 to 24 have been omitted and the lower side members 16 have been selected of greater strength than those shown in Figures 1 and 2 so as to make the bridging unnecessary.

[The tracks 38 which, in Figure 2, have been shown as rigidly attached to cross beam 29, are here hingedly connected to beam 29, which is provided with lugs 51 that cooperate with the downwardly extending plates 52 secured to track 38.]

*The tracks 38' which are to support the automobile B, however, are made from single track lengths corresponding to the combined length of the tracks 38 and 38a of the previous embodiment of the invention. In this case also, the tracks 38' are hingedly connected to the cross beam 29 at a point along their length substantially corresponding to the location of the joint between the tracks 38 and 38a of the previous embodiment. This pivotal connection comprises lugs 51 on the beam 29 cooperating with downwardly extending plates 52 secured to the tracks 38'.* A pivot pin 53 connects members 51 and 52 so as to form a hinge. The hinge is so proportioned that tracks [38] *38'* may be moved upwardly *from their inclined position shown in full lines* into the *substantially horizontal* dotted line position shown in Figure 10, in which position the upper ends of the tracks *forwardly of the pivot* will [lie in] *nest within* the rear ends of the tracks 34. The purpose of this hinged construction will appear as the description proceeds.

After the bridge members 21 to 24 have been removed, or, if the truck is made of such strength that such members are not necessary, car C can be loaded from the side in the following manner.

Figure 11:
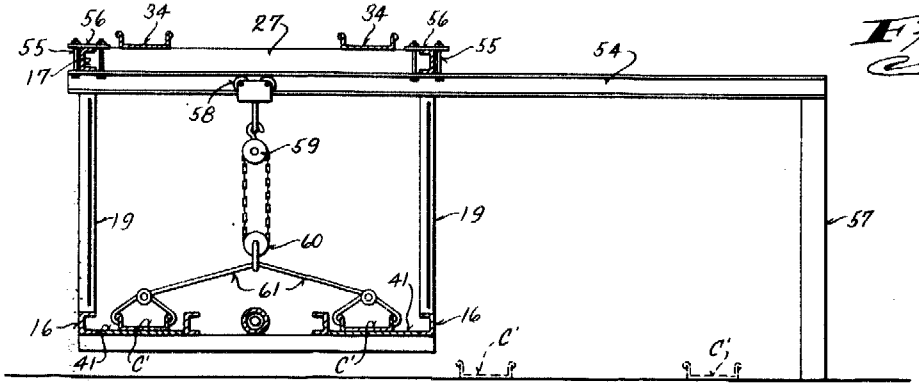
Figure 11 is a section taken on line 11—11, Figure 10.

First of all, the pans 37 are removed and tracks [38] *38'* are [moved] *swung* upwardly into dotted line position. To I-beams 54 are then *temporarily* attached to the *undersides of the* upper frame members 17 by bolts 55 and straps 56, as shown in Figure 11, or by other suitable means, *spacers 54' being interposed between the members 17 and the rearmost I-beam to bring it beneath the tracks 38'.* The I-beams are of such length that they extend to the side a distance which is greater than the width of an automobile and the outer ends are supported by posts 57. Tracks C' that are constructed in a manner similar to tracks 34 and [38] *38'*, are now placed on the ground along the side of the truck and spaced so as to receive the wheels of the automobile that is to be loaded, somewhat as indicated by dotted lines in Figure 11. On each I-beam is mounted a truck 58. Such trucks are available on the market and are employed in a [similar] *conventional* manner *on the I-beams*. Suspended from the truck is a chain hoist 59 and the lower pulley 60 of the chain hoist is connected by means of cables or chains 61 to tracks C′ in a manner shown in full lines in Figure 11. Car C is now supported on track C′ and the latter are attached to the I-beams 54 by means of the chain hoists. By manipulating the chain hoists in a well known manner, the tracks C′ and the automobiles supported thereon are lifted so as to clear the side member 16 after which the car is pushed towards the left into the truck, whereupon it is lowered by a reverse operation of the hoists until the tracks C′ occupy the solid line position of Fig. 11. Before car C is pushed into the frame, pans 37 are removed so as to give the maximum head room. After the car is in place, pans 37 may be replaced in tracks 34 and since they are well to the side of the frame, they straddle the body of car C and will therefore not interfere with it after it is in position. After car C is positioned as shown, it is bolted to the frame in any approved manner so as to assure that it will remain in position. After car C has been loaded in the manner described, car B is next loaded and this is preferably effected in the following manner.

Tracks [38] *38′* are lifted in elevated position as shown by dotted lines in Figure 10, and are supported by suitable means such as posts, two ramps 62 are now put into position in front of the truck so as to be in alignment with tracks 34. Car B is then driven *front first* up along ramps 62 and over tracks 34 and onto tracks [37] *38′* until the front wheels abut the [chock] *chocks* 40. Before car B is loaded, pans 37 are put into place and covered with a steel plate so as to prevent the wheels of car B from dropping into the pans when it is moved onto tracks [38] *38′*. After car B has been positioned on tracks [38] *38′* and firmly attached, tracks [38] *38′* are then lowered about pivot 53 until [it] *they* [assumes] *assume* [a position] *their inclined positions* like [that] shown in Figure 10, when struts or braces 63, which have one end bolted to the uprights 19 at 64, are connected with tracks [38] *38′* by means of bolts 65. Car B is now in the *rearwardly and downwardly inclined* position it occupies during transportation and it will be observed that it extends rearwardly, substantially to the rear of bumper 66.

Car A is now loaded in the following manner. The ramps 62 being still in position, car A is backed upwardly along these ramps and onto tracks 34, the plates covering pans 37 having in the meantime been removed. When the rear wheels reach pans 37, they drop into these pans, whose inclined ends serve as chocks to hold the car from longitudinal movement. It may, of course, be secured in position by other suitable means so as to make it impossible for the car to move substantially during transportation. When the rear wheels of a car A move into the pans, the rear end of [the] *its* body drops [and the parts are so proportioned that the rear end of car A laps the upper end of car B and is positioned underneath tracks 38 and 38a in the manner shown in the drawings.] *under the upwardly projecting end of car B in the manner previously described.*

[Attention is also called to the fact that the front ends of tracks 34 are downwardly inclined so that car A will set as low as possible after it has been loaded.]

Although car B is preferably loaded in accordance with the method above described, it is evident, however, that it may be loaded by placing the tracks [38] *38′* in the full line inclined position shown in Figure 10 and then connecting with [the] *their* lower ends the ramps 62. Car B may now be driven by its own power or pulled by means of suitable tackle or by horses, or otherwise upwardly until it reaches the dotted line position, after which the chocks 40 are put into place. [With this construction tracks 38 would not require the hinged connection with the frame. Since the I-beams 54 at the rear occupy a position normally occupied by tracks 38, it is necessary to raise them into dotted line position in order to secure the rear I-beam to the frame. I-beams 54 are, of course, removed after car C has been loaded.]

After the truck has reached its destination, car B is first unloaded by removing the chocks and running it onto suitable ramps, and thereafter car A is unloaded. The I-beams 54 are *again* [now] put into position, together with the chain hoists and car C is lifted and moved outwardly to a position outside of the truck, whereupon it is lowered onto the ground and driven away.

[As has already been pointed out, by] *By* means of this construction it is possible to transport three cars on the tractor [and] *without exceeding the commonly accepted height limitations and to* bring the total length of the tractor and trailer within the statutory limit of forty-five feet, which is the maximum length permitted in most states.

The inclination of the ends of pans 37 is preferably such that the car can move out under its own power.

It is, of course, understood that after the cars have been positioned on the tracks, they are secured by suitable tiedowns in the manner now common.

[The constructions illustrated on the drawings and described herein may be varied in nonimportant details, but must retain a construction in which cars A and B are arranged in overlapping position. The frame of structural steel employed may be selected from those now available' but must be of sufficient length and strength. The methods of loading that have been described may be varied as the object is to load the automobiles into the approximate positions shown.] *The constructions illustrated on the drawings and described herein may be varied in nonimportant details, but must retain a track arrangement in which cars A and B are supported in the overlapping position shown. The methods of loading that have been described may be varied, as the main object of this invention resides more particularly in the provision of a truck constructed as described; and featuring tracks arranged to support three automobiles on the truck in a predetermined position relative to the truck and in a space lengthwise of the truck considerably less than twice the length of the automobiles, thus enabling a trailer to be connected to the truck to carry two more cars, one above the other, without exceeding the commonly accepted overall length limitation of 45 feet for the tractor-trailer combination.*

Having described the invention what is claimed as new is:

[1. An automobile transporting truck comprising: a chassis; front wheels supporting the front end of said chassis; rear wheels supporting the rear end of said chassis; a first automobile-supporting track extending substantially horizontally between said front and back wheels to carry a first automobile; a second automobile-supporting track positioned above said first track to carry a second automobile above the first automobile, said second track extending substantially horizontally from a position over said front wheels and forwardly of the forward extremity of said first track and terminating at its rear extremity forward of the rear extremity of said first track; a third automobile-supporting track extending rearwardly and downwardly, from a position in the plane of, and rearward of, said second automobile-supporting track, to a point behind said rear wheels and below the plane of the tops of said wheels; a movable track portion; means for securing said latter portion between the rear extremity of the second automobile supporting track and the forward extremity of the third automobile supporting track to form one continuous track for loading purposes; and means for supporting said movable track portion in alignment with and in front of said third automobile supporting track to carry the forward portion of a third automobile above the rearward portion of the second automobile when travelling.]

[2. An automobile transporting truck comprising: a chassis; front wheels supporting the front end of said chassis; rear wheels supporting the rear end of said chassis; a first automobile-supporting track extending substantially horizontally between said front and back wheels to carry a first automobile; a second automobile-supporting track positioned above said first track to carry a second automobile above the first automobile, said second track extending substantially horizontally from a position over said front wheels and forwardly of the forward extremity of said first track and terminating at its rear extremity forward of the rear extremity of said first track; a third automobile-supporting track extending from a position above the rear extremity of said second track rearwardly and downwardly to a point rearward of said rear wheels and below the plane of the tops of said wheels to carry a third automobile; pivot means supporting said third automobile-supporting track intermediate its extremities, said pivot means being positioned in the plane of said second automobile supporting track and rearwardly thereof so that the forward extremity of the third track may be swung downwardly into alignment with the second track for loading purposes.]

*3. An automobile transport truck comprising: an elongated chassis; front wheels supporting the front end of said chassis; rear wheels supporting the rear end of said chassis; a first automobile supporting track; means mounting said first track on the chassis with the track extending substantially horizontally lengthwise between said front and rear wheels to carry a first automobile at a low level on the truck; a second automobile supporting track; means on the truck for supporting said second track lengthwise of the truck at an elevation above said first track, the rear of said second track terminating intermediate the ends of the truck, and the front portion thereof projecting forwardly beyond the front of the first track and lying over the front wheels of the truck to support a second automobile thereon above the first automobile and partly forwardly of said first automobile; a third automobile supporting track*

*including front and rear track sections; means on the truck for supporting said rear track section in a rearwardly and downwardly inclined position at the rear of the truck with the front of the rear track section spaced a distance over the rear portion of the first track, adjacent to the rear of said second track and substantially at the level thereof, and with the rear portion of the rear track section extending rearwardly and downwardly to a point behind said rear wheels and below the plane of the tops of said wheels; and means for detachably mounting said front track section on the truck substantially in alignment with and in front of said rear track section to form one continuous inclined track at the rear of the truck, said front track section being adapted to support the forward portion of a third automobile on the third track above the rearward portion of the second automobile when traveling.*

*4. An automobile transport truck comprising: a chassis; front wheels supporting the front end of said chassis; rear wheels supporting the rear end of said chassis; a first automobile supporting track; means for supporting said first track on the truck in a position extending substantially horizontally between said front and rear wheels and adjacent to the level of the chassis to carry a first automobile at a low level on the truck; a second automobile supporting track; means for supporting said second track on the truck in a position above said first track to carry a second automobile above the first automobile, said second track extending substantially horizontally from a position spaced above and over said front wheels, forwardly of the forward extremity of said first track, and terminating at its rear extremity forwardly of the rear extremity of said first track; a third automobile supporting track; means for supporting said third track on the truck in an inclined position with its forward end extending forwardly and upwardly beyond the level of said second track and adjacent to the rear extremity thereof, and with its rear end extending rearwardly and downwardly over the rear end of the first track to a point rearwardly of said rear wheels and below the plane of the tops of said wheels to carry a third automobile partly above the first automobile, said last named supporting means including pivot means intermediate the extremities of said third track and adjacent to the level of the rear of said second track and rearwardly thereof, said pivot means enabling upward tilting of said third track to a substantially horizontal position at a level substantially corresponding to the level of the rear of said second track and forming a continuation thereof to provide for back and forth transfer of automobiles between said second and third tracks during loading and unloading of the truck.*

*5. An automobile transport truck of the type having pairs of front and rear wheels and a driver's cab at the front thereof above said front wheels, said truck being adapted for use with a short trailer capable of carrying two full size automobiles: characterized by the fact that the truck has a length substantially less than twice the length of full size automobiles to be transported on the truck; and further characterized by the provision of substantially horizontal automobile supporting tracks mounted on the truck medially lengthwise thereof at a low level adjacent to the level of the wheel axes and with their forward ends near the back of said cab; upper substantially horizontal automobile supporting tracks mounted on the front end portion of the truck*

*lengthwise thereof with their front end portions extending forwardly over the driver's cab and their rear end portions overlying but spaced above the lower tracks a distance to accommodate the underlying portions of an automobile supported on said lower tracks; a third set of automobile supporting tracks supported on the truck at the rear portion thereof in a position of relatively steep downward and rearward incline, the lower ends of said inclined tracks terminating adjacent to the rear of the truck and to the level of the lower tracks, and said inclined tracks extending forwardly and upwardly over the rear of the lower tracks to have the upper portions of said inclined tracks extend upwardly a distance above the level of the rear ends of the upper tracks to enable an automobile to be supported on the inclined tracks in a similar inclined attitude with its forward end overlapping the rearward end of an automobile on said upper tracks; and means mounting said third set of tracks on the truck for movement from said inclined position to an elevated second position substantially aligning with said upper tracks and forming a continuation thereof to enable an automobile to be transferred from one to the other of said last mentioned tracks.*

*6. An automobile transport truck for carrying three full size automobiles within an overall length substantially less than twice the length of an average full size automobile, said truck comprising: front and back wheels; a body having a main portion between the front and back wheels with its bottom extending substantially horizontally lengthwise of the truck and at a low level adjacent to the level of the wheel axes, and having a rear portion over the back wheels; an engine and driver's cab portion in front of the body at the extreme front end of the truck over the front wheels with the cab above the engine; a bottom automobile supporting structure in the bottom of the main body portion for supporting an automobile in a substantially horizontal position lengthwise of the truck and at a low level adjacent to the level of the wheel axes and substantially filling the main body portion with its forward end closely adjacent to the front wheels and its rear end closely adjacent to the back wheels; an upper substantially horizontal automobile supporting structure mounted on the forepart of the body portion lengthwise of the truck with its front end portion extending forwardly over the driver's cab and the front wheels thereunder, and its rear portion overlying but spaced above said bottom automobile supporting structure a distance to accommodate the underlying portion of an automobile on said bottom automobile supporting structure; and an inclined automobile supporting structure mounted on the rear portion of the body over the rear of said bottom automobile supporting structure and the back wheels, in a position of relatively steep downward and rearward incline with the lower end thereof terminating adjacent to the rear of the truck and the level of the bottom automobile supporting structure, and the upper portion of*

*said inclined supporting structure extending upwardly a distance above the level of the rear of said upper automobile supporting structure to enable an automobile to be supported on the inclined supporting structure in an inclined attitude with its forward end overlapping the rearward end of an automobile on said upper automobile supporting structure.*

*7. An automobile transport truck for carrying three full size automobiles within an overall length substantially less than twice the length of an average full size automobile, said truck comprising: front and back wheels; a body having a main portion between the front and back wheels with its bottom extending substantially horizontally lengthwise of the truck and at a low level adjacent to the level of the wheel axes, and having a rear portion over the back wheels; an engine and driver's cab in front of the body at the extreme front end of the truck over the front wheels with the cab above the engine; automobile supporting means in the bottom of the body portion for supporting a first automobile in a substantially horizontal position lengthwise of the truck and at a low level adjacent to the level of the wheel axes and substantially filling the main body portion with its forward end closely adjacent to the front wheels and its rear end closely adjacent to the back wheels; automobile supporting means mounted on the forepart of the main body portion at an elevation above said first designated automobile supporting means and displaced partly forwardly relative to the same for supporting a second automobile lengthwise of the truck with its front end portion extending forwardly over the driver's cab and the front wheels thereunder and its rear portion overlying the first automobile; and means on the rear portion of the body for supporting a third automobile in a position of relatively steep downward and rearward incline, said last named means including laterally opposite supporting surfaces disposed adjacent to the rear of the body and near the level of the wheel axes to receive the wheels at the lower end of said third automobile, and other laterally opposite supporting surfaces disposed near the medial portion of the body at a distance above the level of the supporting means for the second automobile to receive the wheels at the upper end of said third automobile, whereby to enable the upper end of said third automobile to overlap the adjacent portion of the second automobile.*

EDWARD V. GARNETT.

REFERENCES CITED

The following references are of record in the file of this patent or in the original patent:

UNITED STATES PATENTS

| Number | Name | Date |
|---|---|---|
| 1,809,557 | Lishon | June 9, 1931 |
| 2,103,669 | Francis | Dec. 28, 1937 |
| 2,385,115 | Stuart | Sept. 18, 1945 |

Certificate of Correction

Reissue No. 23,187 January 10, 1950

EDWARD V. GARNETT

It is hereby certified that errors appear in the printed specification of the above numbered patent requiring correction as follows:

Column 1, line 25, for the numeral "*2½*" read *12½* ; line 35, for the word "*restriction*" read *restrictions* ; column 3, line 16, for "have" read having ; column 4, line 35, for "[directly]" read [; directly] ; column 6, line 41, after "the", second occurrence, insert [tractor] ; same line 41, the word "truck" should be italicized; column 8, line 60, for "To" read Two ;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*